United States Patent [19]

Santamaria, Jr.

[11] 3,771,561

[45] Nov. 13, 1973

[54] VALVE

[76] Inventor: James V. Santamaria, Jr., 1224 Wisteria Dr., R.D. No. 1, Malvern, Pa. 19355

[22] Filed: Mar. 14, 1972

[21] Appl. No.: 234,506

[52] U.S. Cl. .............................. 137/610, 137/625.48
[51] Int. Cl. ............................................. F16k 11/14
[58] Field of Search .................... 137/625.48, 625.4, 137/625.5, 609, 610, 611

[56] References Cited
UNITED STATES PATENTS

| 3,132,669 | 5/1964 | Feldsted | 251/347 X |
| 3,463,193 | 8/1969 | Yost | 137/625.48 X |
| 3,135,292 | 6/1964 | Roberts | 137/609 |
| 3,566,908 | 3/1971 | Macnak | 137/609 X |
| 2,998,828 | 9/1961 | Hare | 137/625.48 X |
| 3,089,515 | 5/1963 | Bochan | 137/610 |
| 3,682,575 | 8/1972 | Guddal et al. | 137/625.48 X |

Primary Examiner—Samuel Scott
Attorney—Louis V. Schiavo

[57] ABSTRACT

A valve is provided for use in a conduit system at the juncture of a main conduit section with a pair of conduit sections branching therefrom. The valve is provided with a movable valve part operable for switching material drawn through said system back and forth selectively between said branches.

7 Claims, 6 Drawing Figures

Patented Nov. 13, 1973    3,771,561

Patented Nov. 13, 1973  3,771,561

VALVE

BACKGROUND OF THE INVENTION

1. Field of the Invention This invention relates to valves and more particularly to a slide gate valve for use in a conduit system suitably subjected to vacuum for conveying comminuted material.

2. Description of the Prior Art It is conventional to employ a rotary or flap gate type valve in a conduit system between a main conduit section and a pair of conduit sections branching therefrom, the valve being operable for switching a flow of comminuted material back and forth selectively between the two branches. The rotary type of valve has not proved to be entirely satisfactory for some purposes because of complications experienced in the design and fabrication of such a valve, and because of trouble experienced in the use of the valve. The flap gate type of valve has not proved to be entirely satisfactory either. Particles of the comminuted material lodge on the valve seat and make it difficult for the gate to seat properly and thereby form an effective seal against leakage past the gate. In addition, the comminuted material impinges upon the gate and is deflected thereby from the main conduit section into the selected branch. This wears the gate and sharply limits the useful life of the valve.

SUMMARY OF THE INVENTION

An important object of the present invention is to provide a novel valve operable for switching a flow of comminuted material back and forth selectively between two branches of a conduit system through which the material is drawn by vacuum applied to the system.

Another object of the present invention is to provide such a valve wherein the movable valve part is a slide gate and comminuted material lodged in a pocket on the upstream side of the gate serves to deflect the flow of material from the main conduit section to the branch of the conduit which is open, thereby protecting the valve against excessive wear and prolonging the useful life thereof.

Another object of the present invention is to provide such a valve with means effectively sealing the valve pneumatically against atmosphere.

Another object of the present invention is to provide such a valve with means effectively sealing the several conduit sections pneumatically against the surfaces of the slide gate, said means also being effective for wiping the surfaces of the gate as it moves back and forth.

Still another object of the present invention is to provide such a valve which is simple in design, economical to fabricate and simple and rugged in use, and which has a prolonged useful life.

BRIEF DESCRIPTION OF THE DRAWINGS

FIG. 6 is an enlarged view of the encircled area "B" in FIG. 3.

DESCRIPTION OF THE PREFERRED EMBODIMENT

Figure 1:
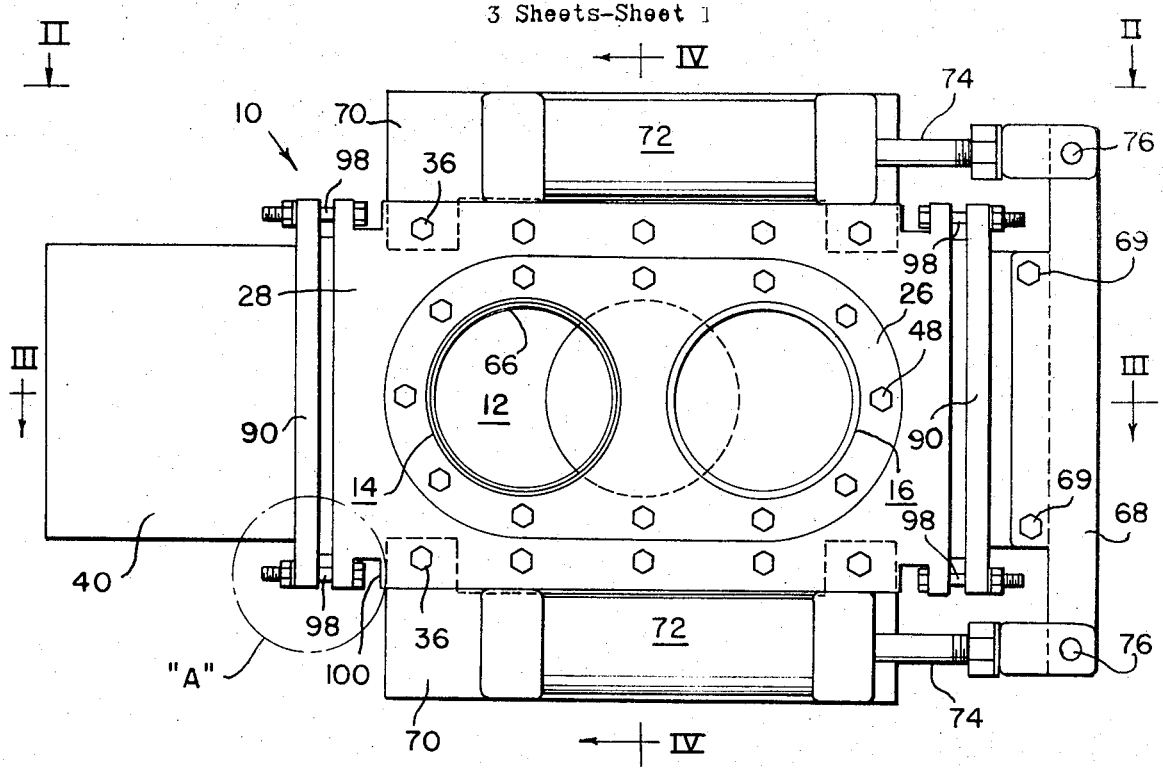
FIG. 1 is a front view of a valve constructed in accordance with the present invention, the slide gate being shown in retracted position for flow of material through the conduit branch on the left.

The following description is directed to the specific embodiment of the invention disclosed in the drawings. It is not addressed to the scope of the invention, which may be practiced in a variety of forms.

Referring to the drawings, apparatus constructed in accordance with the present invention comprises a valve, generally designated 10, mounting means 12 on the upstream side thereof for connecting the valve to a main conduit section, and means 14 and 16 on the downstream side thereof respectively for connecting the valve to a pair of branch conduit sections.

The connection means 12 comprises short sections of conduit 18 and 20 respectively at opposite ends thereof. The section 18 is cylindrical while the section 20 is uniform and generally oval in transverse section, being flat on top and bottom and rounded on opposite sides. Interposed between the sections 18 and 20 is an intermediate section 22 of conduit similarly generally oval in transverse section, but provided with rounded opposite sides which diverge in downstream direction from the section 18 to the section 20, each side being disposed at an angle of approximately 45° to the longitudinal axis of the connection means 12. Embracing the section 20 of conduit is a flange 24 set back somewhat from the end of the section.

The connection means 14 and 16 are short cylindrical sections of conduit of the same diameter as the conduit section 18. They are laterally spaced and embraced by a flange plate 26 set back somewhat from corresponding ends of the sections.

The body part of the valve, generally designated 28, is provided with front and back wall plates, respectively designated 30 and 32, separated by a pair of spacers 34 respectively extending across the top and bottom of the wall plates. The plates and spacers are bolted together, as at 36, and conjointly provide a sleeve with a through opening 38 rectangular in transverse section for slidably receiving the movable part of the valve, i.e., a gate 40.

For mounting the means 14 and 16 to the front plate 30, the plate is provided with laterally spaced openings 42, which are enlarged in diameter on the upstream side of the plate, as at 44, for a purpose to appear. The upstream ends of the conduit sections 14 and 16 extend freely respectively through the openings 42. A gusset 46 of suitable material is interposed between the plate 30 and the flange 26, and the latter is secured to the plate by studs 48 threaded into the plate. The upstream ends of the conduit sections 14 and 16 terminate just short of the gate 40, and each of the annular spaces extending about the terminal portions of the conduit sections 14 and 16 accommodates a metal ring 50 which carries a strip preferably of Teflon (not shown). Interposed between the ring 50 and the bottom of the annular space which accommodates it is a shim 53 of thin sheet material.

For mounting the means 12 to the back plate 32, the plate is provided with an opening 54 which is generally oval in shape, and which is enlarged on the downstream side of the plate, as at 56, for a purpose to appear. The downstream end of the short section of conduit 20 extends freely through the opening 54. A gusset 58 of suitable material is interposed between the plate 32 and the flange 24, and the latter is secured to the plate by studs 60 threaded into the plate. The downstream end of the conduit section 20 terminates just short of the gate 40, and the generally oval space extending about the terminal portion of the conduit section 20 accommodates a correspondingly shaped member 62 made of metal, which carries a strip 64 preferably of Teflon. Interposed between the member 62 and the bottom of the space which accommodates it is a shim 63 of thin sheet material. The Teflon strips carried by the rings 50 and the member 62 effect seals against the gate 40. For example refer to FIG. 6.

The gate 40 is a rectangular plate member which extends through the opening 38 in the sleeve or body part 28 of the valve. As indicated hereinbefore, the gate is slidable back and forth in the body part 28. In its retracted position (FIG. 1) an opening 66 therein registers with the opening through the conduit section 14 and one end of the opening through the conduit section 20. In its extended position (not shown) the opening 66 registers with the opening through the conduit section 16 and the opposite end of the opening through the conduit section 20. Extending across one end of the gate 40 is a yoke plate 68 secured to the gate by bolts 69, and extending respectively across the top and bottom of the body part 28 of the valve are a pair of brackets 70 secured to the back plate 32 by bolts 36. The brackets 70 respectively mount air cylinders 72 provided with extensible piston rods 74 connected by pivot elements 76 to opposite end portions of the yoke 68. Means is provided at each end of the body part 28 for pneumatically sealing the body part 28 against atmosphere.

In this connection, at each end of the body part 28, the plates 30 and 32 are provided with recesses, as at 78, which form terminal portions 80 reduced in thickness. In addition, the spacers 34 are recessed or blocked out, as at 82 and 84 to form a terminal portion 86 reduced in depth. Thus a pocket is provided which extends about the gate 40, and which accommodates sealing members 88 preferably of Teflon impregnated asbestos disposed deep in the pocket and retained therein by a collar 90.

The collar comprises a main body 92 which forms a sleeve with a through opening 94 of the same size and shape as and in registry with the opening 38 in the body part 28 of the valve. One end of the sleeve extends into the pocket formed as aforesaid to hold the sealing members 88 in position, deep in the pocket. The opposite end of the collar is provided with a flange 96 fastened to the plates 30 and 32 by means of bolts 98. In this connection, the front plate 30 and the back plate 32 are notched out, as at 100, to accommodate the heads of the bolts 98. The shanks of the bolts are disposed between the front and back plates.

The valve 10 may be connected in a conduit system maintained under vacuum for drawing comminuted material from a source thereof through a main conduit section connected to the upstream side of the valve by connection means 12 and selectively through either of two branches connected to the downstream side of the valve by connection means 14 and 16.

Figure 2:
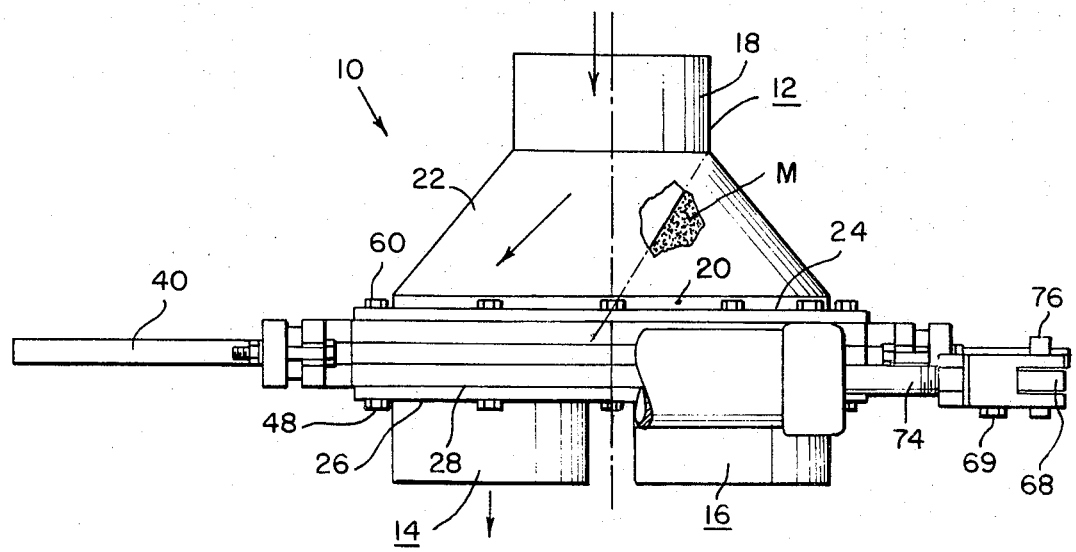
FIG. 2 is a fragmentary plan view of the valve.
Figure 3:
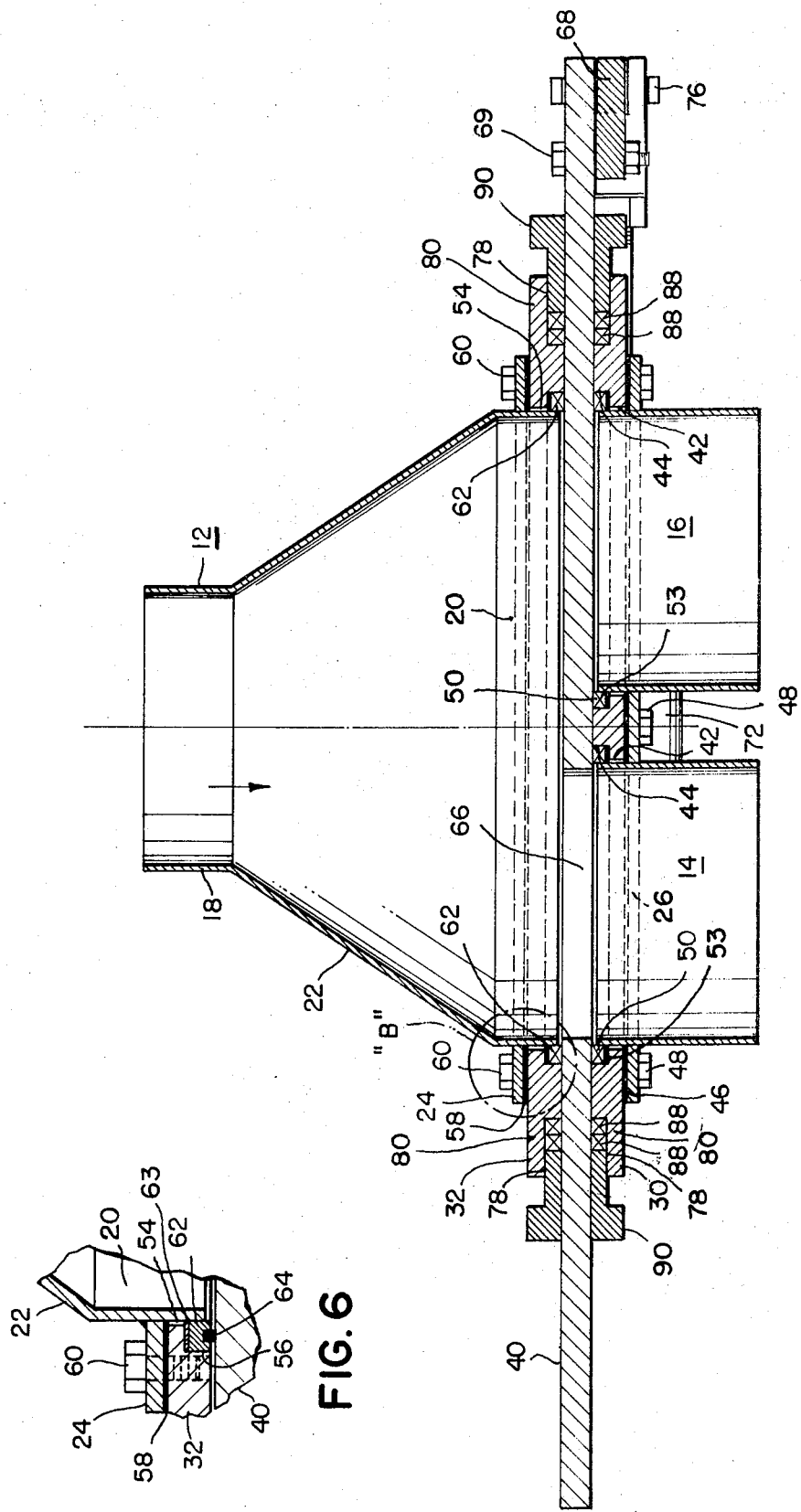
FIGS. 3 and 4 are sections respectively on lines III—III and IV—IV in FIG. 1.
Figure 4:
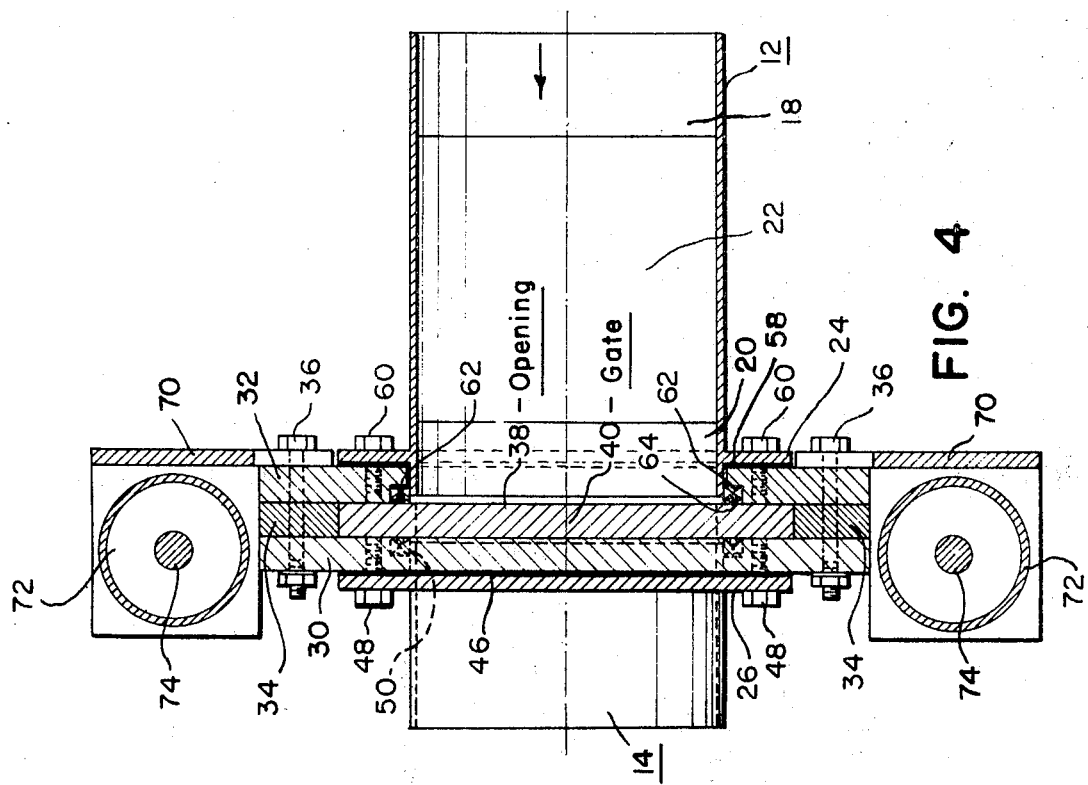
Figure 5:
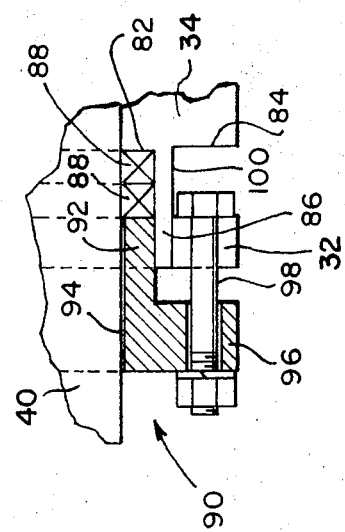
FIG. 5 is an enlarged view of the encircled area "A" in FIG. 1, a corner area of the front body plate being broken away to expose certain details.

It will be observed that when the gate 40 is in the retracted position shown, and the flow of comminuted material is through the connection means 12 and 14, the material conveyed initially will lodge in the pocket included between the gate 40 and the side of the intermediate conduit section 22 of the connection means 12 remote from the connection means 14, and that when the gate 40 is in its extended position, and the flow of comminuted material is through the connection means 12 and 16, the material conveyed initially will lodge in the pocket included between the gate 40 and the side of the intermediate conduit section 22 of the connection means 12 remote from the connection means 16. The material packed in the pocket, designated M in FIG. 2, deflects the material being conveyed and directs it into the one of the connection means 14 and 16 that is open. The flowing material normally does not impinge upon the gate 40. Thus excessive wear and tear on the gate is avoided and the useful life of the valve is prolonged.

It will also be observed that the opening through the sleeve or body part 28 of the valve is effectively sealed against loss of negative pressure through suction of air from atmosphere into the conduit system. In order to reach the interior of the conduit system air from atmosphere must pass by the seals 88 at one end of the sleeve or body part 28 of the valve, and also pass by the seal 64 or the seal carried by one of the rings 50. In other words, the only possible passages for leakage of air from atmosphere into the conduit system are double sealed.

In addition, it will be observed that the gate is sealed against the sealing means on each side thereof, and that since the gate slides over, but never leaves, its seat, it is wiped clean by the sealing means as it moves back and forth. At the same time, it is always effectively seated upon the sealing means.

It is also to be observed that when the gate is shifted from either extreme position to the other, it begins to close one branch before it begins to open the other. The delay depends upon the distance between the branches, which, if desired, may be such that when the opening through the gate is midway between the branches, both branches are closed.

While in accordance with the provisions of the patent statutes, I have illustrated and described the best form or embodiment of my invention now known to me, it will be apparent to those skilled in the art that changes may be made in the form of the valve described without departing from the spirit and scope of the invention. For example, the slide gate may be actuated by means other than air cylinders. In addition, the free ends of the connection means 12, 14 and 16 may mount flanges for connection into the conduit system.

What is claimed is:

1. In a valve for use in a conduit system at the juncture of a main conduit section with a pair of conduit sections branching therefrom, the combination comprising A. a body part comprising means including a pair of plate members respectively extending across the front and back of said valve and affording a sleeve which defines a narrow rectangular opening extending through said body part, B. a flat gate plate slidably projected through said opening and disposed with the opposite end portions thereof respectively extending beyond the opposite end portions of said body part, the opposite end portions of said opening being enlarged in transverse section whereby to form a pair of open pockets each extending about said gate plate and deep into the associated end of said body part, C. sealing means of a material having a low coefficient of friction slidably embracing said gate plate and nested deep in said pockets, D. a pair of collars slidably embracing said gate plate and extending respectively into said pockets a selected distance for securing said sealing means against displacement, E. an open ended conduit section carried by said back wall, one end portion thereof extending through an opening in said back wall and being set back a short distance from said gate plate, and the opposite end portion thereof being adapted for connection to said main conduit section, F. a pair of open ended conduit sections carried by said front wall, corresponding end portions of said conduit sections extending respectively through a pair of openings in said front wall and being set back a short distance from said gate plate, and corresponding opposite end portions thereof being adapted for connection respectively to said pair of branch conduits, G. sealing means embracing the conduit sections carried by said back and front walls and slidably engaging said gate plate to effectively serve as seats therefor, and H. means for actuating said gate plate.

2. The combination according to claim 1 wherein a pair of spacer members respectively extending across the top and bottom of the body part are sandwiched between a pair of plate members which respectively provide the front and back walls of said body part, said spacer members serve to secure said plate members in mutually overlying laterally spaced relation, the width and depth of the narrow rectangular opening extending through the body part correspond respectively to the thickness of, and the clear distance between, said spacer members, and the opposite end portions of the front and back wall plate and spacer members are recessed to provide the enlarged portions of said narrow rectangular opening and the pockets in which the sealing means are nested.

3. The combination according to claim 2 wherein means is provided for securing the collars to the front and back wall plate members, and said securing means are operable for advancing said collars to selectively position the same relative to the sealing means nested in the pockets.

4. The combination according to claim 3 wherein the openings in said back and front walls through which the open ended conduit sections extend have enlarged sections adjacent the gate plate affording pockets each extending about the associated open ended conduit section, metallic members extend about said openings, each being nested in the associated one of said pockets, said metallic members carry sealing means of a material having a low coefficient of friction, and means nested in said pockets urge said metallic members toward said gate plate and thereby the sealing means against the sides of said gate plate to thereby conjointly afford a seat for the same on each side thereof.

5. The combination according to claim 3 wherein the openings in said back and front walls through which the open ended conduit sections extend have enlarged sections adjacent the gate plate affording pockets each extending about the associated open ended conduit section, metallic members extend about said openings, each being nested in the associated one of said pockets, said metallic members carry Teflon sealing strips embedded therein, and shims of metal nested in said pockets urge said metallic members towards said gate plate and thereby the Teflon sealing strips into sealing engagement with the gate plate to thereby conjointly afford seats respectively on opposite sides of said gate plate.

6. The combination according to claim 1 wherein the means for actuating the gate comprises fluid cylinder means carried by the body part, said fluid cylinder means and said gate being disposed in laterally spaced, mutually overlying parallel relation, and piston means working in said cylinder and extending therefrom along said gate for connection to one end thereof.

7. The combination according to claim 6 wherein the fluid cylinder means comprises a fluid cylinder disposed above and extending across the open ended conduit sections carried by the body part, and a fluid cylinder disposed below and extending across the open ended conduit sections carried by said body part, and wherein the pistons working in said fluid cylinders respectively extend therefrom along the bottom and top of the gate for connection to one end thereof.

* * * * *